(12) United States Patent
Bonte et al.

(10) Patent No.: US 12,097,966 B2
(45) Date of Patent: Sep. 24, 2024

(54) FUEL PIPE ASSEMBLY

(71) Applicant: AIRBUS OPERATIONS LIMITED, Bristol (GB)

(72) Inventors: Eric Bonte, Bristol (GB); David Petit, Bristol (GB); Anthony Bryant, Bristol (GB); Daniel Peachey, Bristol (GB); Javier Ruiz-De-Pablo, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 409 days.

(21) Appl. No.: 17/387,191

(22) Filed: Jul. 28, 2021

(65) Prior Publication Data

US 2022/0055766 A1 Feb. 24, 2022

(30) Foreign Application Priority Data

Aug. 18, 2020 (GB) ...................................... 2012883

(51) Int. Cl.
*B64D 37/00* (2006.01)
*B64C 3/18* (2006.01)

(52) U.S. Cl.
CPC ............ *B64D 37/005* (2013.01); *B64C 3/187* (2013.01)

(58) Field of Classification Search
CPC ......... B64D 37/005; B64C 3/187; B64C 1/26; F16L 37/107; F16L 21/06
See application file for complete search history.

(56) References Cited

U.S. PATENT DOCUMENTS

| 5,667,251 | A | * | 9/1997 | Prest | ..................... F16L 37/248 |
| | | | | | 285/376 |
| 2009/0322078 | A1 | * | 12/2009 | Wern | ...................... F16L 25/01 |
| | | | | | 285/413 |
| 2014/0265303 | A1 | * | 9/2014 | Ismert | ................... F16L 37/123 |
| | | | | | 285/12 |
| 2019/0178425 | A1 | * | 6/2019 | Shirsale | .................. F16L 21/06 |

FOREIGN PATENT DOCUMENTS

| CH | 405839 | | 1/1966 | | |
| EP | 1698820 | A1 * | 9/2006 | ............ | F16L 37/113 |
| FR | 874709 | | 8/1942 | | |
| GB | 2572021 | A * | 9/2019 | ........... | B64D 37/005 |

OTHER PUBLICATIONS

Combined Search and Examination Report for GB2012883.1, dated Apr. 21, 2021, 12 pages.

* cited by examiner

*Primary Examiner* — Valentina Xavier
(74) *Attorney, Agent, or Firm* — Nixon & Vanderhye P.C.

(57) ABSTRACT

A fuel pipe assembly is disclosed including a connector having a socket and a lug arrangement extending from the socket, a pipe having a first end portion adapted to fit within the socket, and a retainer having first and second parts which together form a collar configured to retain a pipe. The retainer has an open condition in which a pipe is insertable, and a closed condition. The retainer also has a channel arranged, in the closed condition, to capture the lug arrangement.

17 Claims, 8 Drawing Sheets

FUEL PIPE ASSEMBLY

CROSS RELATED APPLICATION

This application claims priority to United Kingdom (GB) Patent Application 2012883.1, filed Aug. 18, 2020, the entire content of which is hereby incorporated by reference.

FIELD OF TECHNOLOGY

This invention relates to a fuel pipe assembly, such as may be found on an aircraft. The invention also relates to a retainer for the pipes of a fuel pipe assembly, and to a method of assembling fuel pipes employing such a retainer.

BACKGROUND

Aircraft wing boxes can be provided with fluid conduits in the form of fuel pipes, which extend through openings in structural supports, such as ribs. Conduit supports are used to attach the fluid conduits to the structural supports. Such conduit supports are typically attached using threaded fasteners, such as nuts and bolts. One approach is to mount pipe connectors to either side of an opening in a rib. Individual pipe sections are joined between the connectors on adjacent ribs to form the fluid conduit. The pipe connectors act as conduit supports.

It has recently been proposed to use longer fuel pipes in an aircraft fuel pipe assembly in order to reduce the number of connectors, and hence the number of fasteners, required. This reduces the cost and weight of the fuel pipe assembly, as well as providing a time saving during installation. A problem which may be encountered with the use of longer pipes is that the flexing motion of the wing during flight conditions can cause relative movement between the pipe sections and the connectors such that the connection between them is less secure.

BRIEF SUMMARY OF THE TECHNOLOGY

The invention provides a retainer for a fuel pipe assembly comprising first and second parts which together form a collar configured to retain a pipe; the retainer having an open condition in which a pipe is insertable, and a closed condition; the retainer also having a channel arranged, in the closed condition, to capture a lug arrangement on a connector.

The invention further provides a fuel pipe assembly comprising: a connector having a socket and a lug arrangement extending from the socket; a pipe having a first end portion adapted to fit within the socket; and a retainer comprising first and second parts which together form a collar configured to retain a pipe; the retainer having an open condition in which a pipe is insertable, and a closed condition; the retainer also having a channel arranged, in the closed condition, to capture the lug arrangement The provision of a pipe retainer arranged to capture a lug arrangement on the connector reinforces the connection between each pipe and its respective connector. The retainer is easy and quick to install, without the need for other fasteners.

Preferably, the channel and lug arrangement are arranged to cooperate as a bayonet fitting. This simplifies installation of the retainer such that it can be carried out by an operator with no special training.

The lug arrangement may comprise a plurality of lugs e.g. three lugs extending from, and spaced around, the circumference of the socket.

A stop may be provided as an installation aid, to prohibit rotation of the retainer with respect to the connector beyond a predetermined position.

Preferably, the retainer has a protrusion adapted to abut an inner surface of the connector when installed. This provides a secure interface between the retainer and the connector.

Advantageously, anti-rotation means are provided, operable between a "released" position, and a "secured" position, in which the retainer is inhibited from rotational movement with respect to the connector. The anti-rotation means may take the form of a releasable clip arrangement arranged, in the "secured" position, to engage a notch on the or each lug. Alternatively, the anti-rotation means may comprise a releasable pin arrangement arranged, in the "secured" position, to engage an aperture on the or each lug.

Preferably, the or each pipe is flexible or semi-flexible.

The invention further comprises a wing including such a fuel pipe assembly. The connector may be attached to a rib forming part of the wing structure.

Preferably, the wing includes a plurality of ribs and plurality of fuel pipe assemblies as per the present invention, with each connector being attached to a rib and the pipes being arranged to extend between connectors. At least one of the pipes may be arranged to extend between connectors spaced by a plurality of ribs.

A fuselage may be provided with at least one fuel pipe assembly of the present invention. The connectors may be arranged on structural features of the fuselage.

The invention further provides a method of assembling a fuel pipe in an aircraft comprising: inserting a first end portion of a pipe in a socket of a first connector; introducing a retainer in an open condition to the pipe such that the pipe is between first and second parts of the retainer; closing the retainer to form a collar around the pipe; moving the retainer along the pipe towards the connector; and rotating the retainer such that a channel in the retainer engages a lug on the connector.

BRIEF DESCRIPTION OF THE DRAWINGS

The invention will now be described, by way of example, with reference to the accompanying drawings in which.

DETAILED DESCRIPTION OF EMBODIMENTS OF THE TECHNOLOGY

Figure 1:
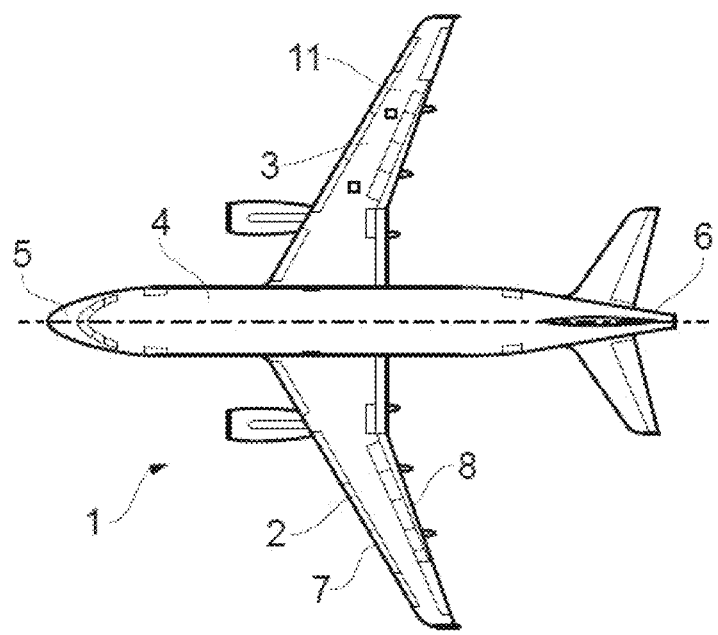
FIG. 1 is a plan view of an aircraft.

With reference to FIG. 1, FIG. 1 shows an existing aircraft 1 with port and starboard fixed wings 2, 3 respectively; and a fuselage 4 with a nose end 5 and a tail end 6. The aircraft 1 is a typical jet passenger transonic transport aircraft but the present invention is applicable to a wide variety of fixed wing aircraft types, including commercial, military, passenger, cargo, jet, propeller, general aviation, etc. with any number of engines attached to the wings or fuselage.

Each wing has a cantilevered structure with a length extending in a span-wise direction from a root to a tip, the root being joined to an aircraft fuselage 4. The wings 2, 3 are similar in construction so only the starboard wing 3 will be described in detail with reference to FIG. 2.

The aircraft 1 includes a centre wing box 9 within the body of the fuselage 4. The centre wing box 9 is joined to an inboard rib 14a which forms the root of the wing 3. The wing 3 includes a series of spaced ribs 14 between the inboard rib 14a and an outboard rib 14b at the starboard wing tip. Each rib 14 defines a rib plane. The rib plane of each rib extends substantially parallel to each adjacent rib plane. The rib plane extends substantially parallel to a chord axis of the wing 3. The ribs 14 form part of a wing box on the starboard wing 3 the wing box 9 also including a front spar 10 and an upper skin cover 11, a rear spar 12, and a lower skin cover 13.

Figure 2:
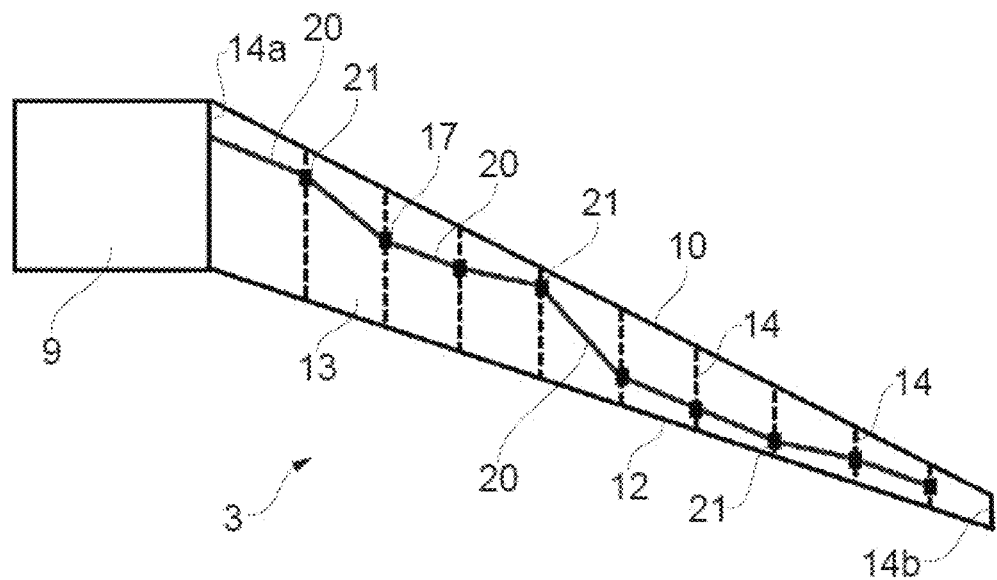
FIG. 2 is a plan view of a conventional fuel pipe assembly on an aircraft wing.

In the conventional wing box shown in FIG. 2, a fuel line extends across multiple ribs. The line extends through openings 17 positioned within the body of each rib 14. The fuel line is formed from multiple short fuel pipe sections 20 that connect to adjacent fuel pipe sections 20 at the ribs 14 using pipe connectors 21 located at the ribs 14. The pipe connectors 21 are disposed on opposing sides of each rib 14 to surround the opening 17. In this example, the fuel line extends across nine ribs 14 through the rib openings 17, although a wing may have any number of ribs 14. The pipe connectors 21 attach to the ribs 14 using fasteners (not shown). As such, the pipe connectors 21 act as supports for the pipe sections 20. The pipe sections 20 are installed as floating pipes, with each pipe section being held captive between adjacent connectors 22.

It will be appreciated that this fuel line employs multiple connectors 21 and consequently many fasteners. Such connectors and fasteners add to the weight and cost of the fuel line assembly, and also increase the time required to install the fuel line. The provision of a fuel line comprising floating pipe sections means that the line has to be assembled in a predetermined sequence: connector, pipe section, connector, pipe section etc If, for any reason, a pipe section needs to be removed, the adjacent pipe sections and connectors need also to be removed in order to free the floating pipe section concerned. In order to address the concerns of extra weight, cost and complexity, it has been proposed to use a fuel line comprising flexible pipe sections, an example of which is shown in FIG. 3.

Figure 3:
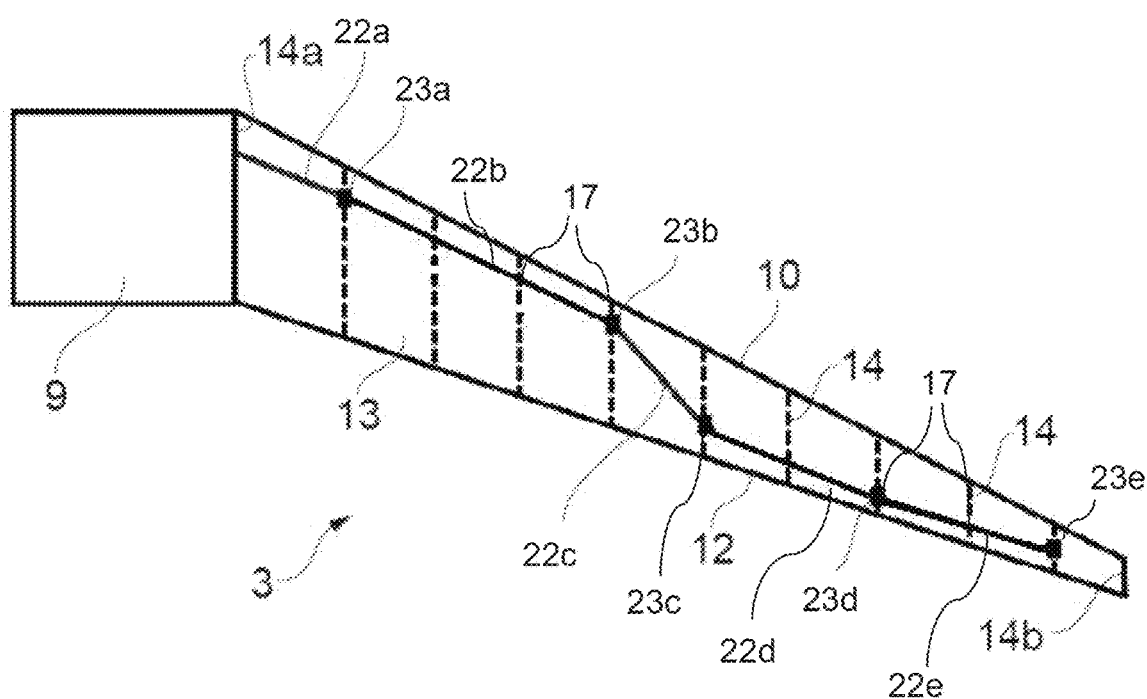
FIG. 3 is a plan view of a pipe assembly constructed according to the invention on an aircraft wing.

In the wing box of FIG. 3, the fuel line comprises longer sections 22 (22a to 22e) of pipe, each of which extends between connectors 23 (23a to e respectively). In this embodiment, the pipe sections 22 are semi-flexible, which permits bends to be introduced into the pipework, if desired. Each section 22 may be arranged to extend between its connectors across multiple ribs 14. For example, the section 22b extends from the first rib to the fourth rib through openings 17 in the second and third ribs. Pipe sections 22d and 22e each extend across two ribs through openings 17 in the intermediate ribs. The provision of longer pipe sections allows the number of connectors to be reduced. This results in a reduction in the number of fasteners needed to install the fuel line, and hence a time saving for the installation process. The reduction of connectors and fasteners also provides a weight and cost saving. However, during flight conditions the wings 2, 3 flex such that there is relative movement between the pipe sections 22 and the connectors 23. There is a need to make the connections between the pipe sections 22 and the connectors 23 more secure.

Figure 4:
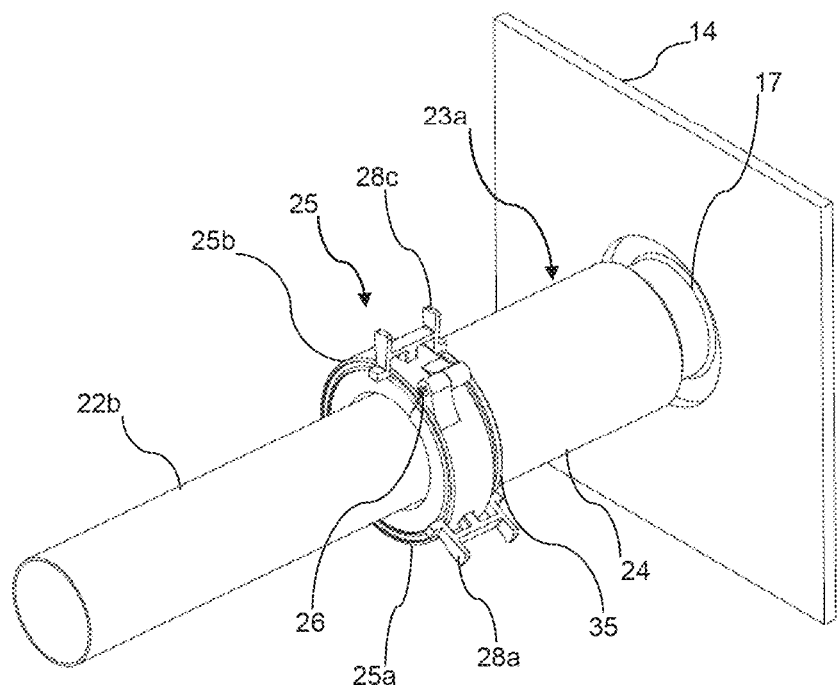
FIG. 4 is a perspective view of part of the pipe assembly of FIG. 3.

FIG. 4 shows the interface between a connector 23a and the longest fuel pipe section 22b. The connector 23a is attached to a structural member in the form of a rib, part of which is shown at 14 in the drawings. The connector 21 extends through an opening 17 in the rib 14. The connector has a region of enlarged cross section arranged to form a socket 24 to receive the pipe section 22b. A similar socket arrangement is provided on the other side of the rib 14, not visible in this drawing, and is provided to receive another pipe section 22a of the fuel pipeline 22. In accordance with the invention, the fuel pipe assembly includes retainers arranged to hold the pipe sections 22a to 22e in their respective connectors 23a to 23e. FIG. 4 illustrates one such retainer 25.

The retainer 25 comprises two semi-circular portions 25a and 25b, which together form a collar configured to fit around a pipe section 22b. The two retainer portions 25a, 25b are joined together by a hinge 26. The retainer portions 25a, 25b are moveable between an open position (see FIG. 5c), in which there is an opening between the parts wide enough to insert a pipe section, and a closed position such as is shown in FIG. 4. A releasable fastener in the form of a clip 27 is provided on the retainer 25, diametrically opposite the hinge 26. The clip 27 has two parts, one on each retainer part 25a, 25b; the clip parts being arranged to co-operate to hold the retainer 25 in a closed position. The clip 27 is releasable to allow the retainer 25 to be opened and then moved or replaced. The retainer 25 also includes three anti-rotation clips 28a, 28b, 28c, spaced equidistantly around the circumference of the retainer. The purpose of the anti-rotation clips 28 is to prevent the retainer 25 from rotating when it is in position on the connector 23a. The function of the anti-rotation clips 28 will be described in more detail later in the specification.

Figure 5A:
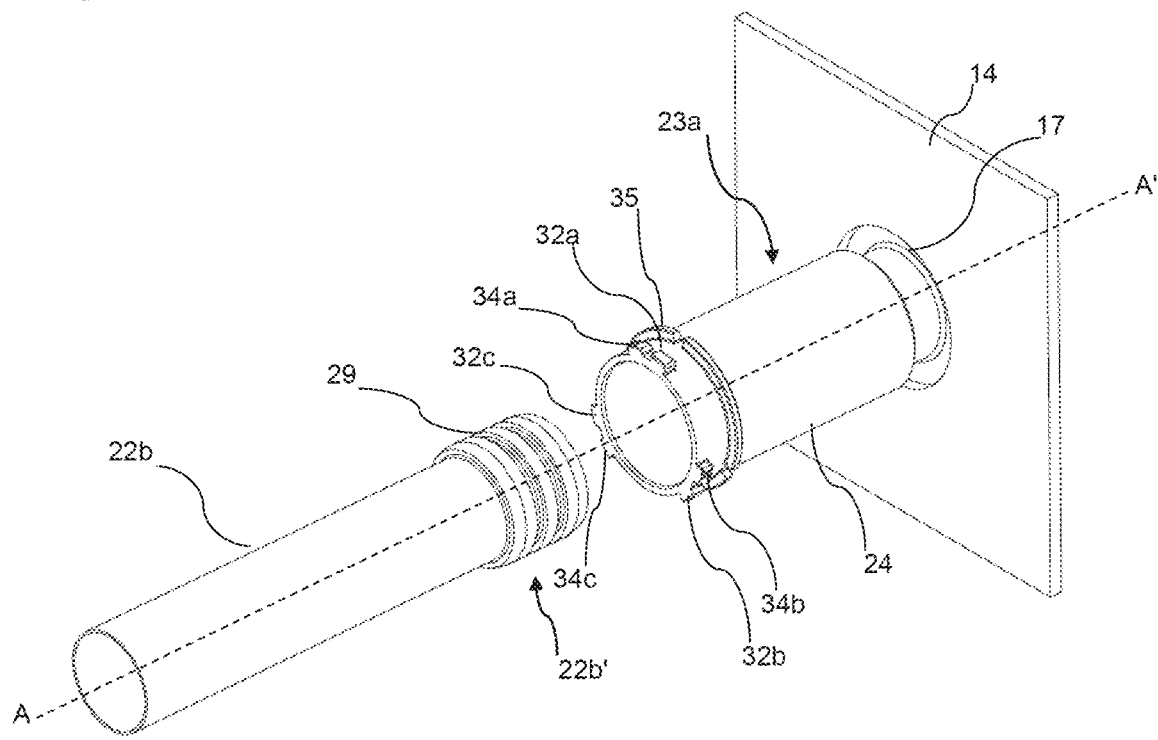
FIGS. 5a to 5e are perspective views showing the steps of installing a fuel pipe in the pipe assembly of FIGS. 3 and 4.

FIGS. 5a to 5e illustrate the steps of installing a fuel pipe section 22b in the fuel line assembly. FIG. 5a shows one end portion 22b' of the pipe section 22b and connector 23a prior to installation. The operator firstly aligns the longitudinal axis of the pipe section 22b with that of the connector 23a along line A-A' so that the pipe section can be pushed into the socket 24 of the connector. The pipe section 22b includes a double seal arrangement 29 on its outer surface. The seal 29 is arranged to allow the pipe section 22b to be pushed into the socket 24 whilst providing a sealing interface with the interior of the socket. The seal 29 is sufficiently compressible to allow the pipe section 22b to flex with respect to the connector 23a in use.

Figure 5B:
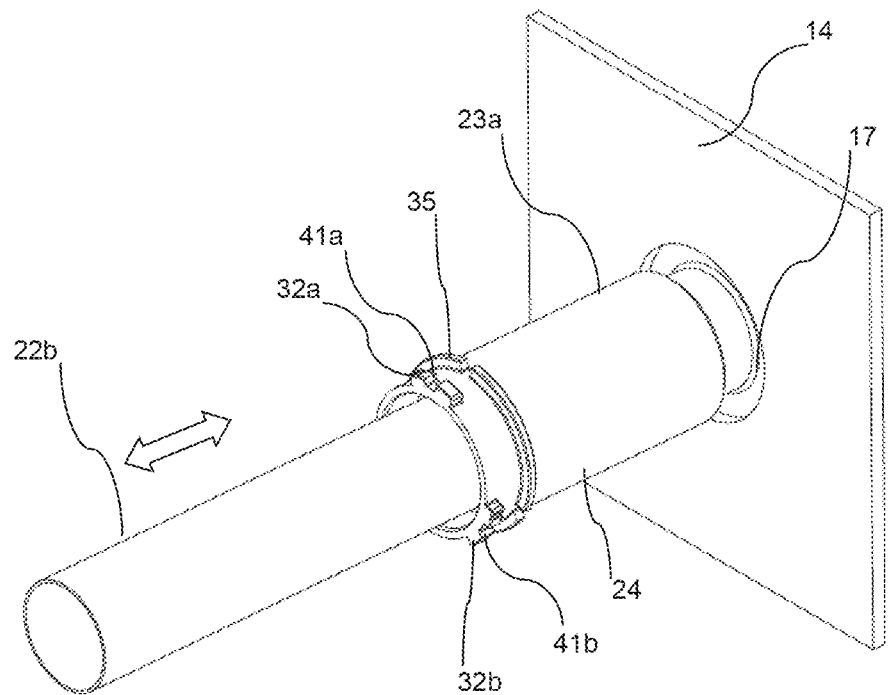
Figure 6:
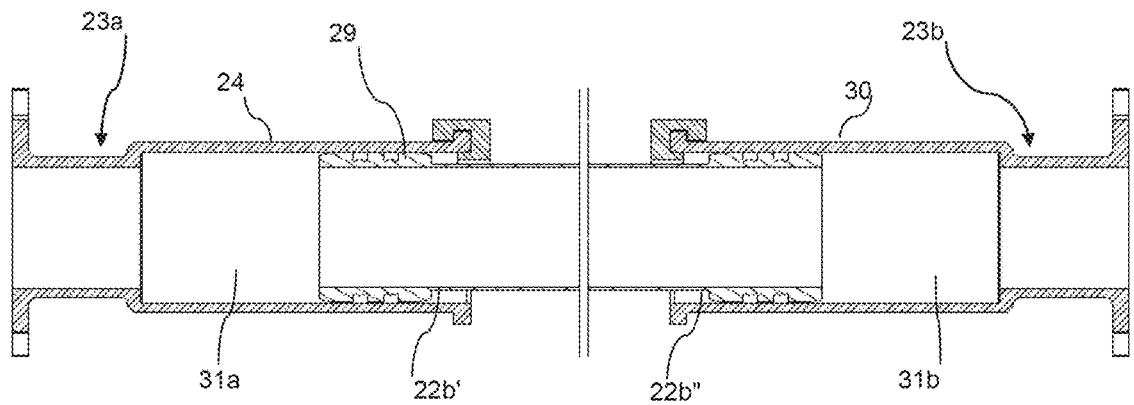
FIG. 6 is a side sectional view showing the end portions of an installed pipe.

In FIG. 5b, the pipe section 22b has been pushed into the socket 24. The dimensions of the pipe section 22b, seal 29 and socket 24 are such that the pipe section cannot be pushed beyond the end wall of the socket. The dimensions of the fuel pipe sections 22 and the sockets 23, and the spacing between them, are arranged to allow to the pipe sections to be installed as floating pipes, such as is shown in FIG. 6. Thus, when the first end portion 22b' of the pipe section 22b has been pushed all the way into the socket 24 of connector 23a, the second end portion 22b" is clear of its intended connector 23b. The second end portion 22b" may then be axially aligned with its connector 23b and pushed into its socket 30. This causes the pipe section 22b to translate along the axis away from the end wall of the socket 24. The position of the pipe 22b is adjusted along the axis until it is approximately central between the sockets 24, 30, as shown in FIG. 6. In this position, there is a gap 31a, 31b between each end portion of the pipe section 22b and the end walls of the respective sockets 24, 30. The sum of these gaps is known as the coupling gap 31 and represents the axial distance required for one end portion of the pipe to abut the end wall of its socket while the other is sufficiently spaced from its socket to allow the operator to remove or insert the pipe section from or into its connector.

Under static conditions, the frictional interface between the exterior surface of the seals 29 and the interior surfaces of the sockets 24, 30 would be sufficient to hold the pipe section 22b in place. However, during flight conditions, as the wing and hence the fuel pipe assembly flexes, it is important to ensure secure connections between the pipe sections and their rigid connectors. Hence, retainers 25 are provided to reinforce the connection between the pipe sections 22 and connectors 23.

Figure 5C:
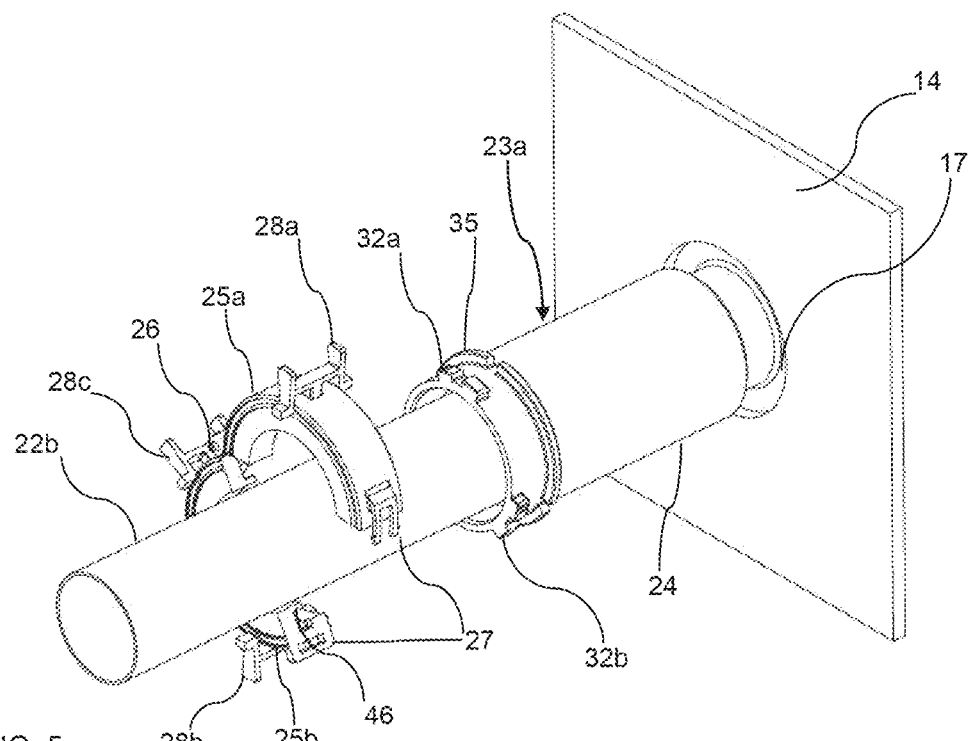
Figure 5D:
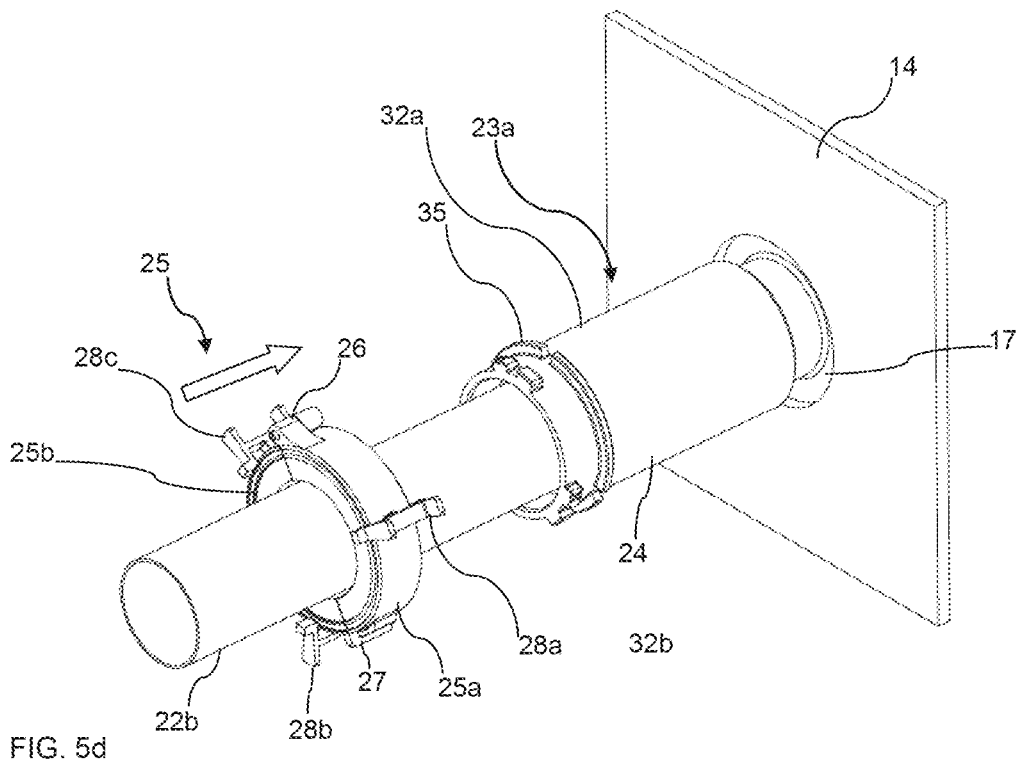

FIG. 5c shows a retainer 25 being introduced to the pipe section 22b. The retainer 25 is in the open condition, with the opening between the retainer portions 25a, 25b being sufficient to accommodate the pipe section 22b. With the retainer 25 in place on the pipe section 22b, the operator brings the retainer parts 25a, 25b together and closes the clip 28, so that the retainer forms a collar around the pipe section. The clip 28 is a simple cantilever snap-fit clip, which has the advantage of being easy to close and open with no loose parts. The closed retainer 25 is then moved along the pipe axis towards the connector 23a, in the direction of the arrow in FIG. 5d, until it meets a lug arrangement 32 protruding outwardly from the opening of the connector. The lug arrangement 32 comprises three lugs 32a, 32b, 32c, spaced equidistantly around the outer circumference of the connector 23a. The lugs 32a, 32b, 32c are arranged to engage in slots 33a, 33b, 33c in the retainer 25, two of which can be seen in the reverse perspective view of FIG. 7 (the rib is omitted from this drawing for clarity).

Figure 5E:
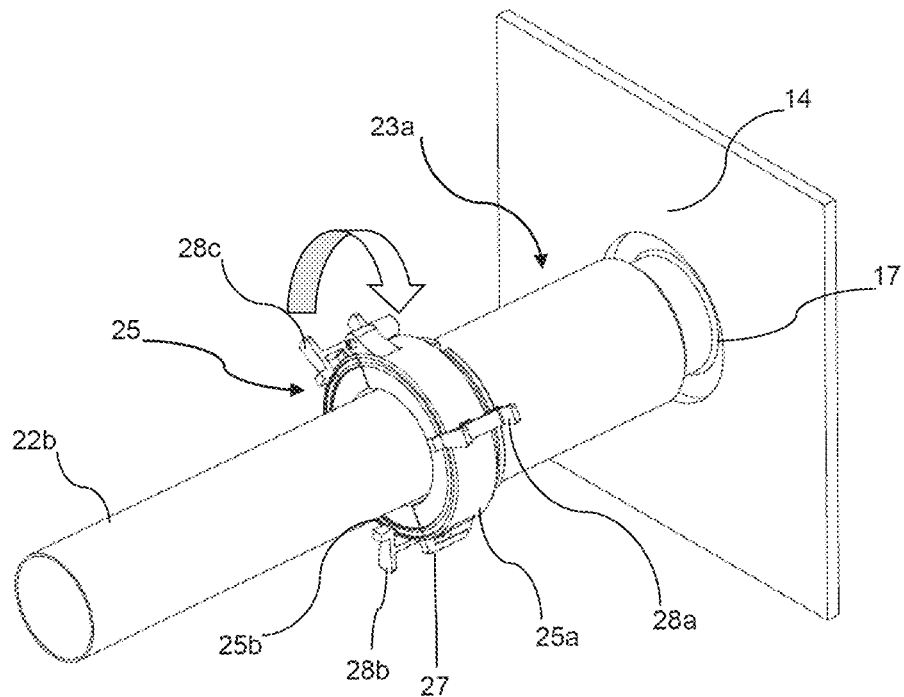

With reference to FIG. 5e, the operator rotates the retainer 25 in the direction shown by the arrow, until the lugs 32a, 32b, 32c find their respective slots 33a, 33b, 33c. The retainer is then further rotated so that the lugs slide in a helical channel (not shown) that extends circumferentially in the retainer 25, until stops (not shown) inside the retainer abut the lugs and prevent further rotation. The combination of the lugs 32, slots 33 and the channel acts as a bayonet mount, with the lugs 32 on the connector 23 being the male part and the slots 33 and channel in the retainer 25 being the female part. The provision of such a bayonet fitting ensures that the operator can easily fit the retainer 25 in the correct position and orientation with respect to the pipe 22 and the connector 23 without the need for any measuring or aligning. FIG. 4 shows the retainer in the installed position.

Figure 7:
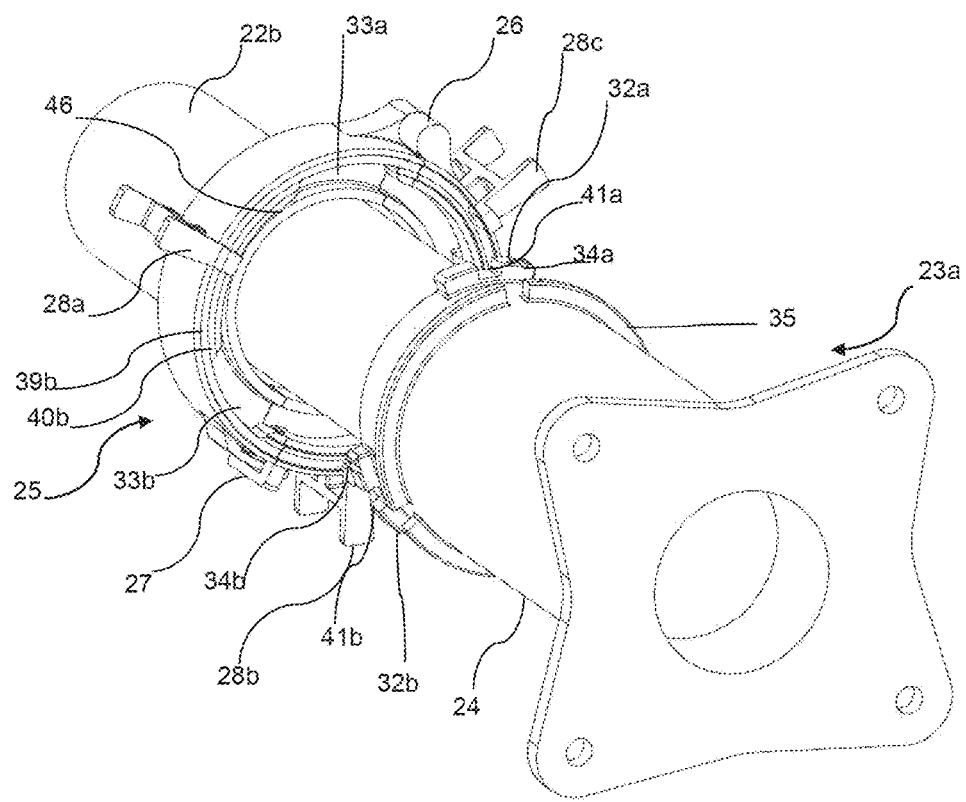
FIG. 7 is a perspective view showing the retainer and connector of FIGS. 4 and 5 in more detail.
Figure 8A:
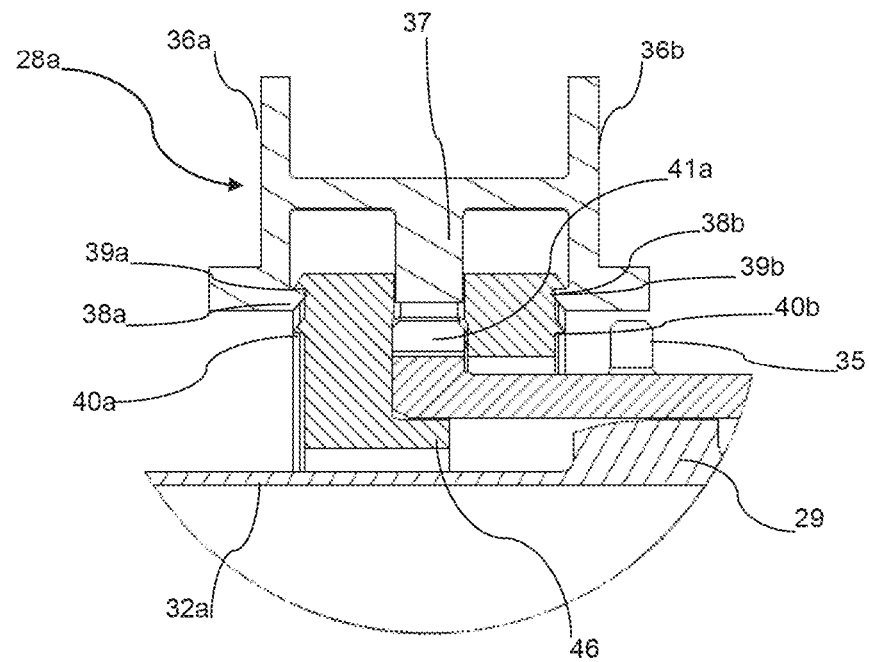
FIG. 8a is a side sectional view of part of the retainer of FIGS. 4, 5 and 7 in a first condition.
Figure 8B:
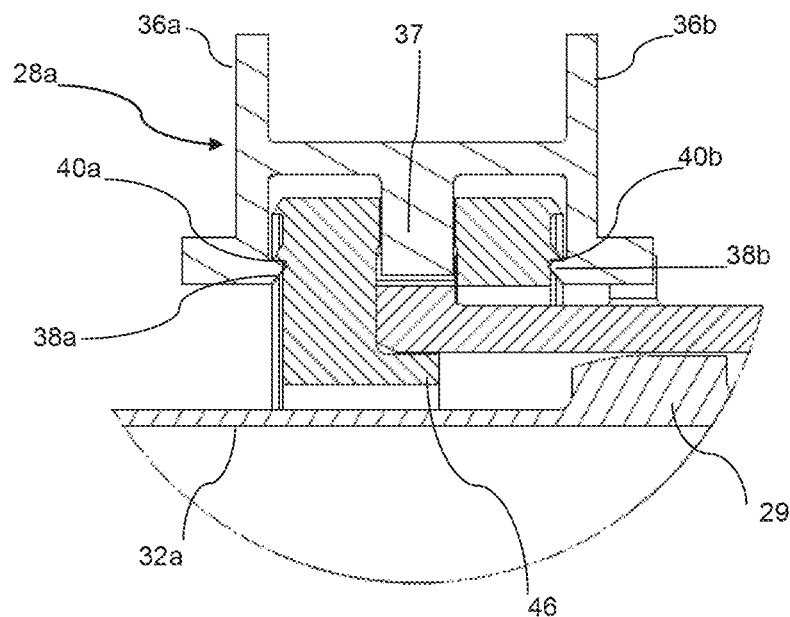
FIGS. 8b is a side sectional view of part of the retainer of FIGS. 4, 5 and 7 in a second condition.

With reference to FIGS. 5c, 7, 8a and 8b, the retainer 25 includes a protrusion in the form of lip 46 that extends around the retainer 25 at, or close to, its inner circumference. The lip 46 extends parallel to the cylindrical axis of the retainer 25. When the retainer 25 is installed, with the bayonet locked in place, the lip 46 protrudes into the socket of the connector 23 and abuts its interior surface, as shown in FIGS. 8a and 8b, thereby preventing the retainer from moving out of its installed position. Thus, the retainer provides a secure connection between the pipe and the connector.

As a further aid to installation, each of the lugs 32a, 32b, 32c on the connector 23a may include a small indent 34a, 34b, 34c respectively on its top surface (more visible in FIG. 7). The retainer 25 includes small internal protrusions (not shown) in its channel that correspond to the position of the indents 34 when the retainer is in the correct orientation. As the retainer 25 is rotated, the lugs 32 are urged against these protrusions until the protrusions "snap" into the indents 34. This provides an indication to the operator that the retainer 25 is in the correct orientation.

The connector 23a further includes a protruding ridge 35 around its circumference, spaced from the lug arrangement 32. The purpose of this circumferential ridge 35 is to prevent the anti-rotation clips 28a, 28b, 28c from being pushed out of their "released" position while the retainer 25 is being installed. When the retainer 25 is in its correct position and orientation, the anti-rotation clips 28 may be pushed into "secured" positions in order to prevent accidental rotation of the retainer out of its installed position. Gaps in the ridge 35, which correspond to the positions of the clips 28 when the retainer is in its correctly installed position, allow the clips 28 to be pushed into their secured positions.

A retainer clip 28a is shown in more detail in the side sectional views of FIGS. 8a and 8b. FIG. 8a shows the clip 28a in a released condition and FIG. 8b shows the clip in a secured condition. The clip 28a comprises two cantilevered arms 36a, 36b, arranged on each end face of the retainer 25, with a central peg 37 that depends towards the centre of the retainer. Each of the arms 36a, 36b has a small inwardly projecting hook 38a, 38b respectively arranged to engage first grooves 39a, 39b that extend around the respective end faces of the retainer. This engagement of the clips 28 in the first groove 39a, 39b inhibits the clips from moving with respect to the retainer 25 during an installation process.

When the retainer is in the correct position and orientation, the operator depresses the clip 28a and pushes it into the "secured" position. The hooks 38a, 38b on the arms 36a, 36b snap-fit into second grooves 40a, 40b in the respective end faces of the retainer 25. The second grooves 40a, 40b are spaced radially inwardly from the first grooves. As the anti-rotation clip 28a is pushed into the retain position, the central peg 37 is urged into a co-operating notch 41a in the lug 32a. The peg 37 is held captive in the notch 41a in the lug 32a and thus the retainer 25 resists rotational movement out of alignment with the connector 23a. The other anti-rotation clips 28b and 28c have the same structure and function, and each has a central peg that engages with a notch 41b, 41c, in the respective lugs 32b, 32c. The clips provide a level of redundancy so that, if any of the clips 28 becomes damaged, the remaining clips will still resist rotation of the retainer 25 out of its correct orientation. As mentioned previously, the ridge 35 on the connector helps to prevent the clips from being pushed incorrectly into the "secured" position. Thus, the clips may only be pushed into the secured position when the retainer is in the fully installed position on the connector.

It is also a simple matter for the operator to remove a retainer 25. By simply squeezing together the tops of the cantilevered arms 36, the clips 28 can each be brought out of the secured position into the release position. The operator then simply rotates the retainer 25 in the opposite direction from that shown in FIG. 5e until the lugs 32 become free of the internal channel in the retainer. The retainer 25 may then be moved axially away from the connector 23 and the clip 27 released to allow the retainer to be opened and removed from the pipe section 22. The pipe section may then also be completely removed from the fuel line if required. The pipe section is removed by pushing it until one end portion abuts the end wall of its socket, at which point the other end portion of the pipe section will be free of its respective socket. The pipe section may then be easily removed.

Figure 9:
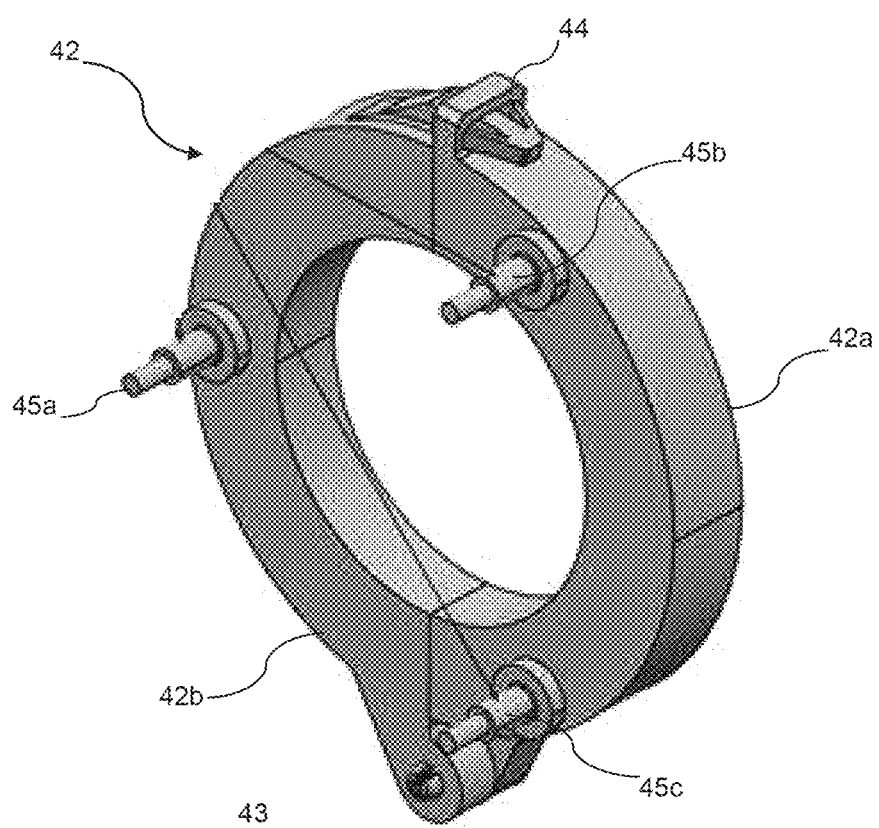
FIG. 9 is a perspective view of an alternative retainer.

An alternative retainer is shown in FIG. 9. In this embodiment, the retainer 42 comprises first and second semicircular portions 42a, 42b, joined together at a hinge 43 as before. The retainer parts are also moveable between an open position and a closed position, and a clip 44 is provided to hold the retainer in the closed position. An operator can introduce the open retainer 42 to a fuel pipe section, close it, translate it along the pipe axis towards the lugs on a connector, and rotate it to engage with the lugs in the manner of a bayonet fitting as before. As an alternative to the anti-rotation clips, this retainer 42 is provided with anti-rotation pins 45a, 45b, 45c, which each extend parallel to its cylindrical axis. The pins 45a, 45b, 45c are shown here in a released position, so that the retainer 42 may be rotated with respect to a pipe connector. The lugs on the pipe connector (not shown) may be provided with apertures instead of notches, the apertures being arranged to extend through the lugs in a direction parallel to the longitudinal axis of the connector. In order to engage the anti-rotation feature of the retainer 42, the pins 45a, 45b, 45c are simply pushed into the respective apertures on the lugs so that the retainer is inhibited from rotating with respect to its connector.

Further variations may be made without departing from the scope of the invention. For example, the invention has been described with reference to a fuel line extending along a wing, but of course it could be employed on fuel line assemblies on an aircraft's fuselage. The aforedescribed fuel line comprises semi-flexible pipe sections; however, the combination of pipes, connectors and retainers may be employed with rigid pipe sections; a combination of rigid pipe sections and flexible pipe sections, or any other type of pipe, such as the conventional fuel line arrangement of FIG. 2.

The hinge on the retainer has been shown as a simple pintle and gudgeon arrangement; this could be replaced by a living hinge, formed by an extension of the material used for the main body of the retainer portions. The retainer, pipe and connector may be made from similar materials, such as plastic reinforced with carbon fibres. The seal may be electrically conductive. Further variations will be apparent to the person skilled in the art.

The invention claimed is:

1. A fuel pipe assembly, comprising:
   a connector having a socket and a lug arrangement extending from the socket;
   a pipe having a first end portion adapted to fit within the socket; and
   a retainer comprising
      a first part, a second part, and a hinge, wherein the first part and the second part are hingedly connected via the hinge and together form a collar configured to retain a pipe;
      wherein the retainer includes an open condition in which a pipe is insertable, and a closed condition; and,
      wherein the retainer includes a channel arranged, in the closed condition, to capture a lug arrangement on a connector.

2. A fuel pipe assembly as claimed in claim 1, in which the channel and lug arrangement are arranged to cooperate as a bayonet fitting.

3. A fuel pipe assembly as claimed in claim 1, in which the lug arrangement comprises a plurality of lugs extending from, and spaced around, the circumference of the socket.

4. A fuel pipe assembly as claimed in claim 1, further comprising a stop arranged to prohibit rotation of the retainer with respect to the connector beyond a predetermined position.

5. A fuel pipe assembly as claimed in claim 1, in which the retainer further comprises a protrusion adapted to abut an inner surface of the connector.

6. A fuel pipe assembly as claimed in claim 1, further comprising anti-rotation means operable between a "released" position, and a "secured" position in which the retainer is inhibited from rotational movement with respect to the connector.

7. A fuel pipe assembly as claimed in claim 6, in which the anti-rotation means comprises a releasable clip arrangement arranged, in the "secured" position, to engage a notch on the lug or each lug.

8. A fuel pipe assembly as claimed in claim 6, in which the anti-rotation means comprises a releasable pin arrangement arranged, in the "secured" position, to engage an aperture on the lug or each lug.

9. A fuel pipe assembly as claimed in claim 1, in which the pipe is flexible or semi-flexible.

10. A wing including a fuel pipe assembly as claimed in claim 1.

11. A wing as claimed in claim 10, further comprising a rib to which the connector is attached.

12. A wing including a plurality of fuel pipe assemblies as claimed in claim 1.

13. A wing as claimed in claim 12, further comprising a plurality of ribs, each connector being attached to a rib and the pipes being arranged to extend between connectors.

14. A wing as claimed in claim 13, in which at least one pipe is arranged to extend between connectors spaced by a plurality of ribs.

15. A fuselage including a fuel pipe assembly as claimed in claim 1.

16. An aircraft including a wing as claimed in claim 1.

17. A method of assembling a fuel pipe in an aircraft, comprising:
   inserting a first end portion of a pipe in a socket of a first connector;
   introducing a retainer in an open condition to the pipe such that the pipe is between first and second parts of the retainer, wherein the first and the second parts of the retainer are hingedly connected to one another via a hinge;
   closing the retainer to form a collar around the pipe;
   moving the retainer along the pipe towards the connector; and,
   rotating the retainer such that a channel in the retainer engages a lug on the connector.

* * * * *